(12) United States Patent
Guruswamy et al.

(10) Patent No.: US 7,797,411 B1
(45) Date of Patent: Sep. 14, 2010

(54) DETECTION AND PREVENTION OF ENCAPSULATED NETWORK ATTACKS USING AN INTERMEDIATE DEVICE

(75) Inventors: Kowsik Guruswamy, Sunnyvale, CA (US); Siyang Yang, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1278 days.

(21) Appl. No.: 11/049,620

(22) Filed: Feb. 2, 2005

(51) Int. Cl.
G06F 15/173 (2006.01)
(52) U.S. Cl. .................. 709/223; 713/152; 709/229
(58) Field of Classification Search .......... 709/223; 370/229, 235, 357, 395.5; 713/150–154; 726/2–4, 11–14, 22, 23
See application file for complete search history.

(56) References Cited

U.S. PATENT DOCUMENTS

| 5,787,253 | A | 7/1998 | McCreery et al. | |
|---|---|---|---|---|
| 6,219,786 | B1 | 4/2001 | Cunningham et al. | |
| 6,499,107 | B1 | 12/2002 | Gleichauf et al. | |
| 6,751,728 | B1* | 6/2004 | Gunter et al. | 713/153 |
| 6,772,345 | B1 | 8/2004 | Shetty | |
| 6,789,116 | B1 | 9/2004 | Sarkissian et al. | |
| 6,918,034 | B1* | 7/2005 | Sengodan et al. | 713/160 |
| 7,007,301 | B2* | 2/2006 | Crosbie et al. | 726/23 |
| 7,076,803 | B2* | 7/2006 | Bruton et al. | 726/23 |
| 7,100,201 | B2* | 8/2006 | Izatt | 726/11 |
| 7,174,566 | B2* | 2/2007 | Yadav | 726/26 |
| 7,222,366 | B2* | 5/2007 | Bruton et al. | 726/23 |
| 7,240,368 | B1* | 7/2007 | Roesch et al. | 726/23 |
| 7,277,404 | B2* | 10/2007 | Tanzella et al. | 370/310 |
| 7,322,044 | B2* | 1/2008 | Hrastar | 726/22 |
| 7,324,447 | B1* | 1/2008 | Morford | 370/231 |
| 7,324,804 | B2* | 1/2008 | Hrastar et al. | 455/410 |
| 7,331,061 | B1* | 2/2008 | Ramsey et al. | 726/23 |
| 7,383,577 | B2* | 6/2008 | Hrastar et al. | 726/23 |
| 7,509,380 | B2* | 3/2009 | Motoyama | 709/206 |
| 7,526,541 | B2* | 4/2009 | Roese et al. | 709/223 |
| 2002/0078370 | A1 | 6/2002 | Tahan | |
| 2002/0144156 | A1 | 10/2002 | Copeland, III | |
| 2002/0198981 | A1 | 12/2002 | Corl, Jr. et al. | |

(Continued)

OTHER PUBLICATIONS

U.S. Patent Application entitled "Application-Layer Monitoring And Profiling Network", U.S. Appl. No. 11/044,619, filed Jan. 27, 2005.

(Continued)

*Primary Examiner*—William C Vaughn, Jr.
*Assistant Examiner*—Thomas Richardson
(74) *Attorney, Agent, or Firm*—Shumaker & Sieffert, P.A.

(57) ABSTRACT

A network device is capable of recognizing and blocking network attacks associated with packet flows regardless of whether the packet flows are encapsulated within network tunnels. For example, the network device includes a filter module that receives packets associated with a network tunnel from an ingress device to an egress device. The filter module applies heuristics to determine whether the packets encapsulate encrypted data units. If the data units are not encrypted, the filter module extracts the data units and generates temporary packets for use within the network device. An attack detection engine within the device analyzes the temporary packets to detect any network attacks carried by the encapsulated data units. A forwarding component selectively forwards the packets to the egress device based on whether any network attacks are detected.

28 Claims, 10 Drawing Sheets

U.S. PATENT DOCUMENTS

| | | |
|---|---|---|
| 2003/0065953 A1 | 4/2003 | Lehmann et al. |
| 2003/0105976 A1 | 6/2003 | Copeland, III |
| 2003/0131263 A1* | 7/2003 | Keane et al. ............. 713/201 |
| 2003/0154399 A1 | 8/2003 | Zuk et al. |
| 2003/0182580 A1 | 9/2003 | Lee |
| 2003/0212903 A1 | 11/2003 | Porras et al. |
| 2003/0217289 A1 | 11/2003 | Ammon et al. |
| 2003/0236990 A1 | 12/2003 | Hrastar et al. |
| 2004/0025044 A1 | 2/2004 | Day |
| 2004/0034800 A1* | 2/2004 | Singhal et al. ............ 713/201 |
| 2004/0083299 A1 | 4/2004 | Dietz et al. |
| 2004/0151382 A1 | 8/2004 | Stellenberg et al. |
| 2004/0255167 A1 | 12/2004 | Knight |
| 2005/0044406 A1* | 2/2005 | Stute ....................... 713/201 |

OTHER PUBLICATIONS

U.S. Patent Application entitled "Compound Attack Detection In A Computer Network", U.S. Appl. No. 11/045,572, filed Jan. 27, 2005.

U.S. Patent Application entitled "Remote Aggregation Of Network Traffic Profiling Data", U.S. Appl. No. 11/044,481, filed Jan. 27, 2005.

U.S. Patent Application entitled "Identification Of Network Policy Violations", U.S. Appl. No. 11/044,332, filed Jan. 27, 2005.

U.S. Patent Application entitled "Automated Change Detection Within A Network Environment", U.S. Appl. No. 11/044,240, filed Jan. 27, 2005.

"Norton Internet Security™ 2003 User's Guide," 2002, Symantec Corporation.

"Ethereal 0.10.0 has been released", Dec. 12, 2003, www.ethereal.com, retrieved from the Internet Archive WayBackMachine, indexed Jan. 1, 2004.

* cited by examiner

DETECTION AND PREVENTION OF ENCAPSULATED NETWORK ATTACKS USING AN INTERMEDIATE DEVICE

TECHNICAL FIELD

The invention relates to computer networks and, more particularly, to detection and prevention of attacks within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

A local network is a collection of interconnected computing devices serving a specific area, such as a business enterprise or office. Such local networks are often connected to an external public network, such as the Internet. Access to the public network comes with certain risks. For example, malicious users on the external network may pretend to be trustworthy and attempt to access the local network. In addition, malicious users may launch network attacks in an attempt disrupt the operation of devices on the local network.

To prevent such attacks, network administrators use various devices and techniques to restrict or monitor electronic traffic flowing between the public network and the local network. A firewall, for example, may be used to block packets addressed to certain computers and prevent unauthorized access to the local network. Other devices may be used to passively monitor traffic for suspicious behavior.

In some instances, the public network may be used as an intermediate network to transport encapsulated packets from a source device to a destination device within the local network. For example, the source device may establish a network "tunnel" to carry encapsulated packets to the destination device. Often packets or other data units that conform to one type of protocol are encapsulated within packets of another type of protocol (i.e., the tunneling protocol). In other words, the packets are transparently communicated through the intermediate public network via the tunnel. This technique may be especially useful when the intermediate network does not support the encapsulated protocol or when it is desirable to securely communicate the encapsulated packets through the public network.

One example of a tunneling protocol is the Generic Routing Encapsulation (GRE) protocol, which is a protocol for encapsulation of an arbitrary network layer protocol over another arbitrary network layer protocol. Another example is the set of Internet Protocol Security (IPsec) protocols that make use of cryptographic technology to establish secure network tunnels. These tunnels allow packets conforming to other network protocols, such as Internet Protocol (IP) packets, to be encapsulated within encrypted packet streams flowing through the public network.

The use of tunnels often presents a challenge in terms of network security. In particular, it is often difficult to detect security threats within the encapsulated packet streams. For example, often only the tunnel ingress and egress devices are involved in establishing the tunnel and, therefore, have knowledge of the tunnel and the encapsulation scheme used by the tunnel. As a result, it is difficult to analyze the encapsulated packets to determine whether the encapsulated packets carry a network attack.

SUMMARY

In general, the invention is directed to techniques for detecting and preventing network attacks. More specifically, an intrusion detection and prevention (IDP) device is described that is capable of recognizing and blocking network attacks associated with packet flows regardless of whether the packet flows are encapsulated within network tunnels.

In one embodiment, a method comprises receiving with an intermediate device packets associated with a network tunnel from an ingress device to an egress device. The method further comprises extracting encapsulated data units from the packets, and analyzing the data units to detect a network attack.

In another embodiment, a network device comprises a filter module, an attack detection engine and a forwarding component. The filter module receives packets associated with a network tunnel from an ingress device to an egress device. The filter module extracts data units encapsulated within the packets. The attack detection engine analyzes the data units to detect a network attack. A forwarding component selectively forwards the packets to the egress device based on whether the network attack is detected.

In another embodiment, a computer-readable medium comprises instructions that cause a programmable processor within a network device to present a user interface that receives input specifying an attack definition. The instructions further cause the network device to configure a forwarding plane of the network device to generate temporary packets from data units encapsulated within packets associated with a network tunnel and apply the attack definition to the temporary packets to detect a network attack.

DETAILED DESCRIPTION

Figure 1:
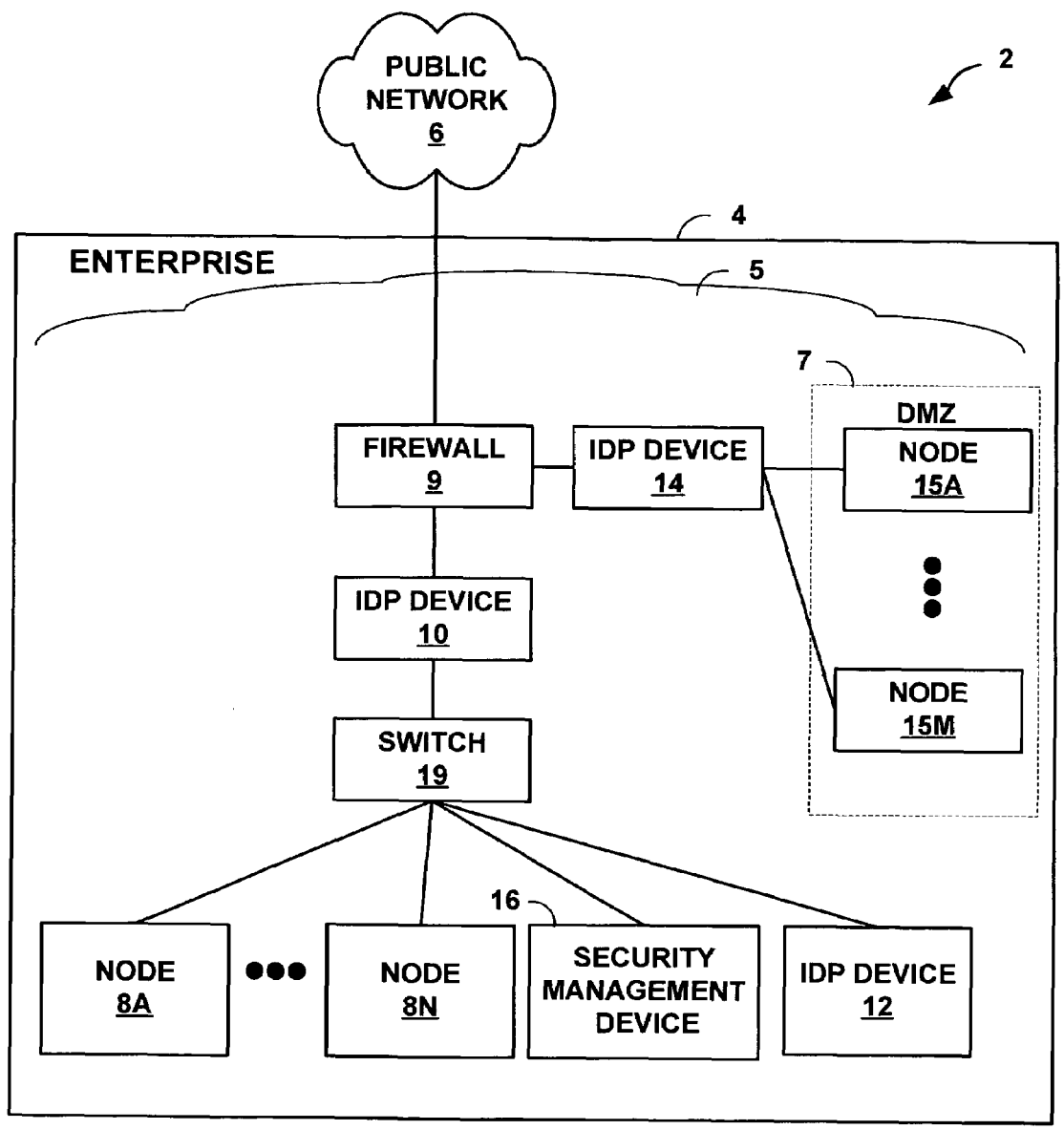
FIG. 1 is a block diagram illustrating an exemplary computer network in which an intrusion detection and prevention (IDP) device monitors network traffic in accordance with the principles of the invention.

FIG. 1 is a block diagram illustrating an exemplary system 2 in which enterprise 4 includes a private enterprise computing network 5 that is coupled to public network 6, such as the Internet. Firewall 9 protects enterprise network 5 and, in particular, internal computing nodes 8A-8N. Computing nodes 8A-8N ("computing nodes 8") represent any private computing device within enterprise network 5, including workstations, file servers, print servers, database servers, printers and other devices.

In addition, firewall 9 may provide a "demilitarized zone" (DMZ) 7, which represents a semi-private area of enterprise network 5 that supports limited access by public network 6 via specific communication protocols. For example, client devices (not shown) within public network 6 may have limited access to nodes 15A-15M via the hypertext transport protocol (HTTP) or the file transfer protocol (FTP).

In the example of FIG. 1, enterprise network 5 includes intrusion detection and prevention (IDP) device 10 that monitors traffic flowing between firewall 9 and internal computing nodes 8. IDP device 10 analyzes the network traffic to detect network attacks.

In general, IDP device 10 identifies packet flows in the monitored traffic, and transparently reassembles application-layer communications from the packet flows. A set of protocol-specific decoders within the IDP device 10 analyzes the application-layer communications and identifies application-layer transactions. In general, a "transaction" refers to a bounded series of related application-layer communications between peer devices. For example, a single TCP connection can be used to send (receive) multiple HyperText Transfer Protocol (HTTP) requests (responses). As one example, a single web page comprising multiple images and links to html pages may be fetched using a single TCP connection. An HTTP decoder identifies each request/response within the TCP connection as a different transaction.

For each transaction, the corresponding decoder analyzes the application-layer communications and extracts protocol-specific elements. For example, for an FTP login transaction, the FTP decoder may extract a pattern corresponding to a user name, a name for the target device, a name for the client device and other information.

In addition, the decoders may analyze the application-layer communications associated with each transaction to determine whether the communications contain any protocol-specific "anomalies." In general, a protocol anomaly refers to any detected irregularity within an application-layer communication that does not comply with generally accepted rules of communication for a particular protocol. The rules may, for example, be defined by published standards as well as vendor-defined specifications. Other anomalies refer to protocol events (i.e., actions) that technically comply with protocol rules but that may warrant a heightened level of scrutiny. One example of such a protocol event is repeated failure of an FTP login request. Example anomalies for the HTTP protocol include missing HTTP version information, malformed universal resource locators (URLs), directory traversals, header overflow, authentication overflow and cookie overflow. Example anomalies for SMTP protocol include too many recipients, relay attempts, and domain names that exceed a defined length. Example anomalies for the POP3 protocol include user overflow and failed logins. Example anomalies for the FTP protocol include missing arguments, usernames or pathnames that exceed a defined length and failed logins. Other anomalies include abnormal and out-of-specification data transmissions, and commands directing devices to open network connections to devices other than the client devices issuing the commands.

Typical protocol anomalies often cannot easily be detected with conventional pattern matching as the detection is not based on specific text strings. Rather, protocol anomaly detection may be based on relationships between two or more elements of a network protocol and, in particular, determination of whether the relationships conform to the generally accepted rules for that particular protocol. In some situations, protocol anomaly detection may be used to detect unknown and new attacks based on the fact that these attacks deviate from generally accepted communication standards.

IDP device 10 applies attack definitions to the elements or the protocol-specific anomalies identified by the protocol decoders to detect and prevent network attacks. For example, a system administrator may specify an attack definition that includes the protocol anomaly of repeated FTP login failure and a pattern that matches a login username of "root." In this manner, the system administrator may combine pattern analysis with protocol anomalies to define complex attack definitions. In the event of a network attack, IDP device 10 may take one or more programmed actions, such as automatically dropping packet flows associated with the application-layer communications within which the network attack was detected.

In accordance with the principles of the invention, IDP device 10 is capable of recognizing and blocking network attacks associated with flows regardless of whether the flows are encapsulated within network tunnels. In particular, IDP device 10 automatically determines whether received packets are associated with a tunneling protocol and, therefore, includes payloads that encapsulate "data units." In general, the term data unit is used herein to refer to any form of data that may be encapsulated within a network tunnel. Examples of data units include packets, frames, cells or other types of data units. If the packets are associated with a network tunnel, IDP device 10 further analyzes the packets to determine whether the data units encapsulated within the payload are encrypted. As further described below, IDP device 10 may apply protocol-specific algorithms to heuristically determine whether the encapsulated data units are encrypted.

In the event that the encapsulated data units are not encrypted, IDP device 10 constructs temporary packets from the encapsulated data units. The temporary packets mimic non-tunneled packets and are used internally within IDP device 10. In other words, the protocol decoders within IDP device 10 process the temporary packets in a same manner as non-tunneled packets to detect and prevent network attacks. In this manner, IDP device 10 may detect network attacks carried by data units encapsulated within network tunnel even though the IDP device may operate as an intermediate device and not as an endpoint device associated with the network tunnel.

In some embodiments, enterprise network 5 may include multiple IDP devices 10, 12 and 14 located within different regions (e.g., sub-networks) of enterprise network 5. Security management device 18 may operate as a central device for managing IDP devices 10, 12 and 14. Although the example illustrated in FIG. 1 is described in terms of dedicated IDP devices 10, 12 and 14, the functionality described herein may be incorporated within other devices, such as firewall 9 or switch 19. The functionality described herein may be incorporated within devices, such as IDP devices 10 and 14, that selectively forward network traffic based on whether an attack is detected. In other embodiments, the functionality may be incorporated within devices that passively monitor network traffic. For example, an intrusion detection system (IDS) may be coupled to switch 19 to passively monitor network traffic flowing through the switch.

Figure 2:
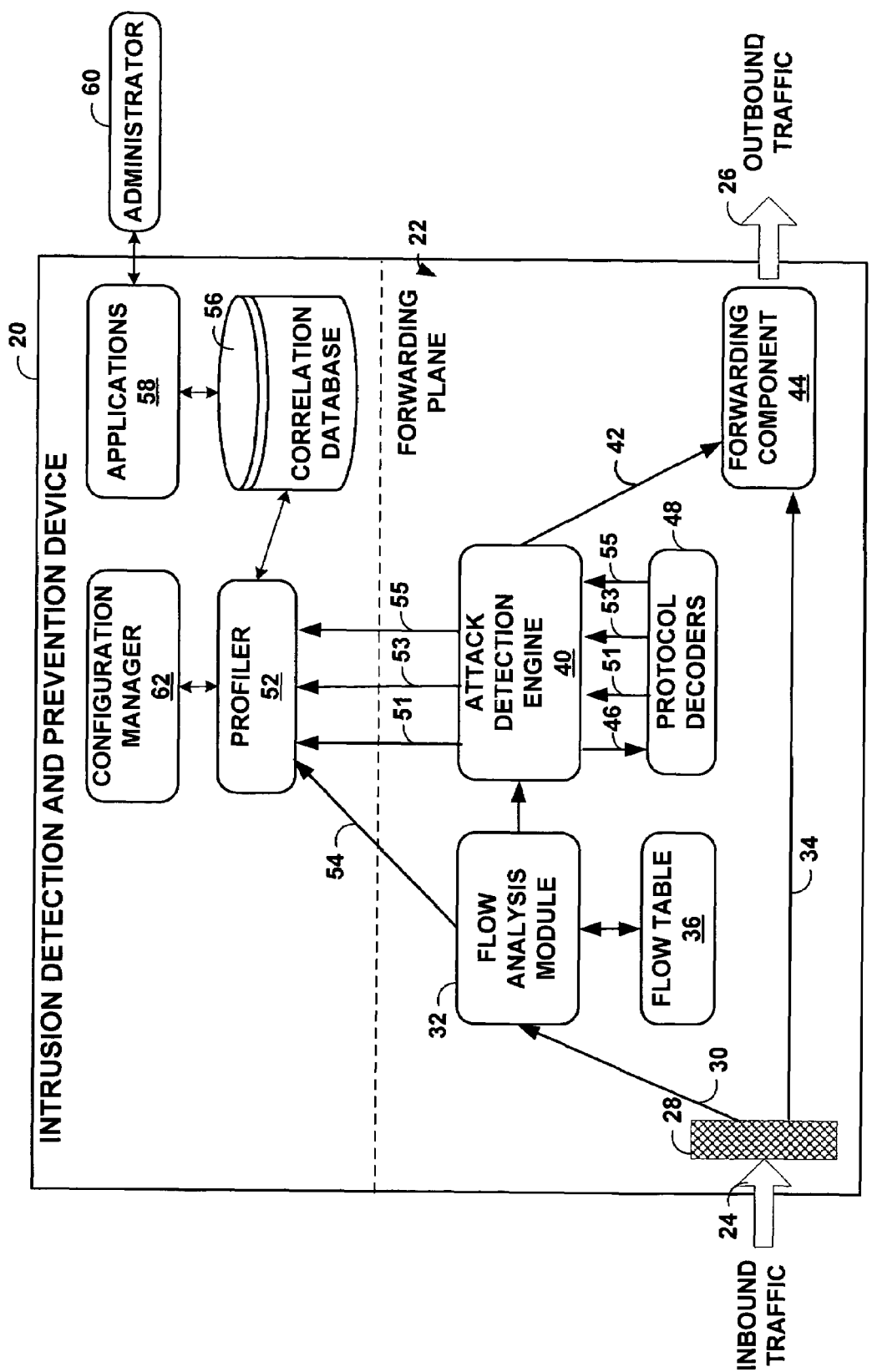
FIG. 2 is a block diagram illustrating an exemplary embodiment of an IDP device in further detail.

FIG. 2 is a block diagram illustrating an example embodiment of an IDP device 20. In the example, IDP device 20 includes a forwarding plane 22 that transparently monitors inbound network traffic 24 and transparently forwards the network traffic as outbound network traffic 26. In the example illustrated by FIG. 2, forwarding plane 22 includes filter module 28, flow analysis module 32, flow table 36, attack detection engine 40, protocol decoders 48 and forwarding component 44.

Filter module 28 receives inbound traffic 24 from a network, such as public network 6 (FIG. 1). In general, filter module 28 automatically determines whether a received packet is associated with a tunneling protocol and, therefore, includes a payload that encapsulates a data unit. If the packet is not associated with a tunneling protocol, filter module 28 passes the non-tunneled packet directly to flow analysis module 32 via packet stream 30. On the other hand, if the incoming packet is associated with a tunneling protocol, filter module 28 further analyzes the packets to determine whether the data unit encapsulated within the payload is encrypted.

If the payload is encrypted, filter module 28 bypasses flow analysis module 32 and attack detection engine 40 by sending the original packet to forwarding component 44 via packet stream 34 for retransmission across the network without further analysis.

In the event that the encapsulated data unit is not encrypted, filter module 28 extracts the encapsulated data unit. In some instances, the original tunneled packet may utilize several layers of encapsulation, and each of these layers might represent a different protocol that has a unique way of encoding or storing the encapsulated data unit. Consequently, filter module 28 may apply several protocol-specific iterations to extract the encapsulated data unit.

Once the unencapsulation process is complete, filter module 28 constructs one or more temporary packets from the encapsulated data unit for processing by flow analysis module 32 and attack detection engine 40. For example, filter module 28 may construct TCP or UDP packets, i.e., protocols capable of being processed by flow analysis module 32 and attack detection engine 40. Filter module 28 passes the temporary packets to flow analysis module 32 via packet stream 30. In other words, the temporary packets join packet stream 30 of unencapsulated packets that flows to flow analysis module 32 and attack detection engine 40 for analysis.

Flow analysis module 32 receives packet stream 30, including the temporary packets, and identifies network flows within the traffic. Each network flow represents a communication session within the network traffic and is identified by at least a source address, a destination address and a communication protocol. Flow analysis module 32 may utilize additional information to specify network flows, including source media access control (MAC) address, destination MAC address, source port and destination port.

Flow analysis module 32 maintains data within flow table 36 that describes each active flow present within the network traffic. Flow analysis module 32 outputs commands 54 that reflect changes to flow table 36. In particular, flow analysis module 32 outputs ADD_FLOW, REMOVE_FLOW and UPDATE_FLOW commands as it modifies flow table 36 to reflect the current network flows. In addition, commands 54 convey network elements associated with each flow, i.e., low-level information such as network hosts, peers, and ports associated with the network traffic.

For each network flow, attack detection engine 40 buffers the packets and reassembles the packets to form application-layer communications 46. Attack detection engine 40 invokes the appropriate one of protocol decoders 48 to analyze the application-layer communications 46. Protocol decoders 48 represent a set of one or more protocol-specific software modules. Each of protocol decoders 48 corresponds to a different communication protocol or service. Examples of communication protocols that may be supported by protocol decoders 48 include the HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols.

Protocol decoders 48 analyze reassembled application-layer communications 46 and output transaction data 51 that identifies application-layer transactions. In particular, transaction data 51 indicate when a series of related application-layer communications between two peer devices starts and ends.

In addition, protocol decoders 48 analyze application-layer communications 46 and extract protocol-specific elements in the form of text. As used herein, the term "application-layer elements" refer to protocol-specific text strings obtained at the application-layer. In particular, protocol decoders 48 extract protocol-specific "contexts" and "values" from the reassembled application-layer communications. In general, "contexts" are named elements within a protocol stream that uniquely identify various types of application-level elements. The named elements provide an application-level basis for describing a communication session. Examples of contexts include file names, user names, application names, names of attached documents, protocol-specific header information, protocol-specific authorization data, form data and other information that describes the communication session. As a particular example, a context for an HTTP protocol stream may include the name of a server providing the HTTP service and the name of the type of web browser (e.g., "Internet Explorer") accessing the server. By reassembling application-layer communications, protocol decoders 48 extract specific contexts (e.g., browser type) and corresponding values (e.g., "Internet Explorer"). Protocol decoders 48 output application-layer elements 53 to attack detection engine 40 for subsequent analysis.

In addition, protocol decoders 48 apply protocol-specific algorithms to application-layer communications 46 to identify protocol anomalies within each transaction. Protocol decoders 48 output protocol anomaly data 55 to attack detection engine 40 for further analysis and use in attack detection.

Attack detection engine 40 receives transaction data 51, application-layer elements 53 and protocol anomaly data 55 from protocol decoders 48. Attack detection engine 40 applies attack definitions to transaction data 51, protocol-specific application-layer elements 53 and anomaly data 55 to detect and prevent network attacks and other security risks.

Based on the analysis, attack detection engine 40 may output instructions 42 to direct forwarding component 44. For example, attack detection engine 40 may output instructions directing forwarding component 44 to drop the packets associated with the communication session, automatically close the communication session or other action. If no security risk is detected for a given application-layer communication session, attack detection engine 40 directs forwarding component 44 to continue to forward the packet flows between the peers. For example, forwarding component 44 may maintain a routing table that stores routes in accordance with a topology of the enterprise network for use in forwarding the packet flows.

Profiler 52 receives commands 54 that describe the updates to flow table 36 including the network elements associated with the network flows. In addition, profiler 52 may receive transaction data 51, application-layer elements 53 and protocol anomaly data 55 from attack detection engine 40. Profiler 52 correlates the network elements and the application-layer elements within correlation database 56. In particular, profiler 52 stores the network elements and application-layer elements within correlation database 56, and builds associations between the application-layer and the network elements. Correlation database 56 may be a relational database, such as SQL Server from Microsoft Corporation. Applications 58 allow users, such as administrator 60, to query correlation database 56 for report generation and analysis.

Configuration manager 62 presents a user interface by which the administrator 60 configures profiler 52. For example, administrator 60 may configure profiler 52 to monitor particular subnets internal to enterprise 4 (FIG. 1). When building associations within correlation database 56, profiler 52 may group all external source network address into a single external source to reduce storage requirements and aid analysis.

Figure 3:
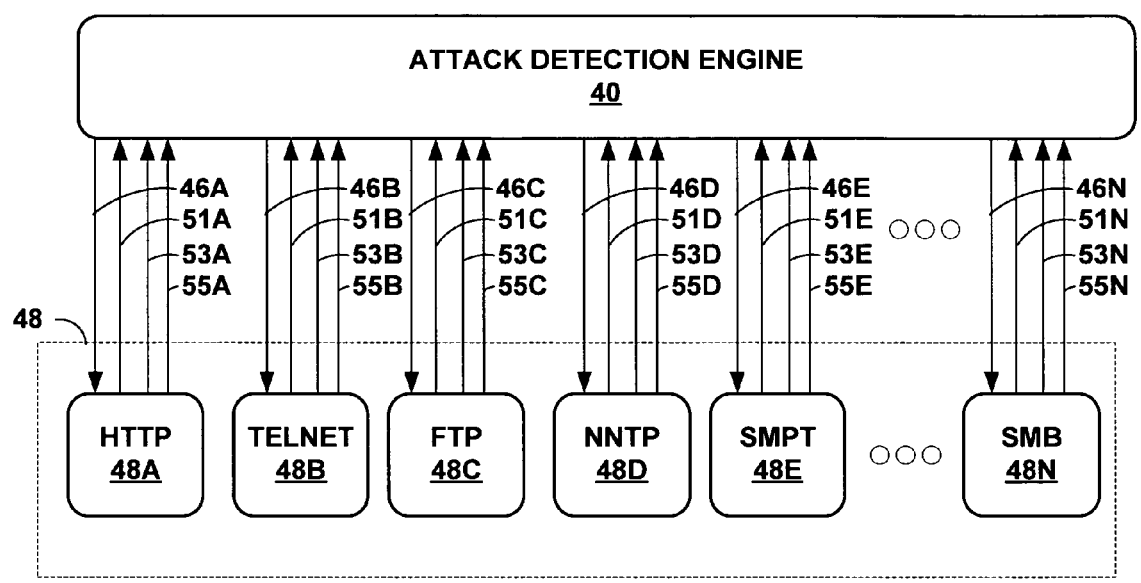
FIG. 3 illustrates a portion of the IDP device of FIG. 2 in further detail.

FIG. 3 illustrates a portion of IDP device 20 (FIG. 2) in further detail. In particular, FIG. 3 illustrates an exemplary set of protocol decoders 48A-48N. In this example, protocol decoders 48A-48N include HTTP decoder 48A, Telnet decoder 48B, FTP decoder 48C, NNTP decoder 48D, SMTP decoder 48E and SMB decoder 48N.

As illustrated in FIG. 3, each of protocol decoders 48A-48N analyzes corresponding protocol-specific application-layer communications 46A-46N that have been reassembled by attack detection engine 40. Based on the analysis, each of protocol decoders 48A-48N output corresponding transaction data 51A-51N identifying transactions within the communications, application-layer elements 53A-53N describing contexts and values associated with the communications, and protocol anomaly data 55A-55N that describe any protocol anomalies detected within the communications.

Figure 4:
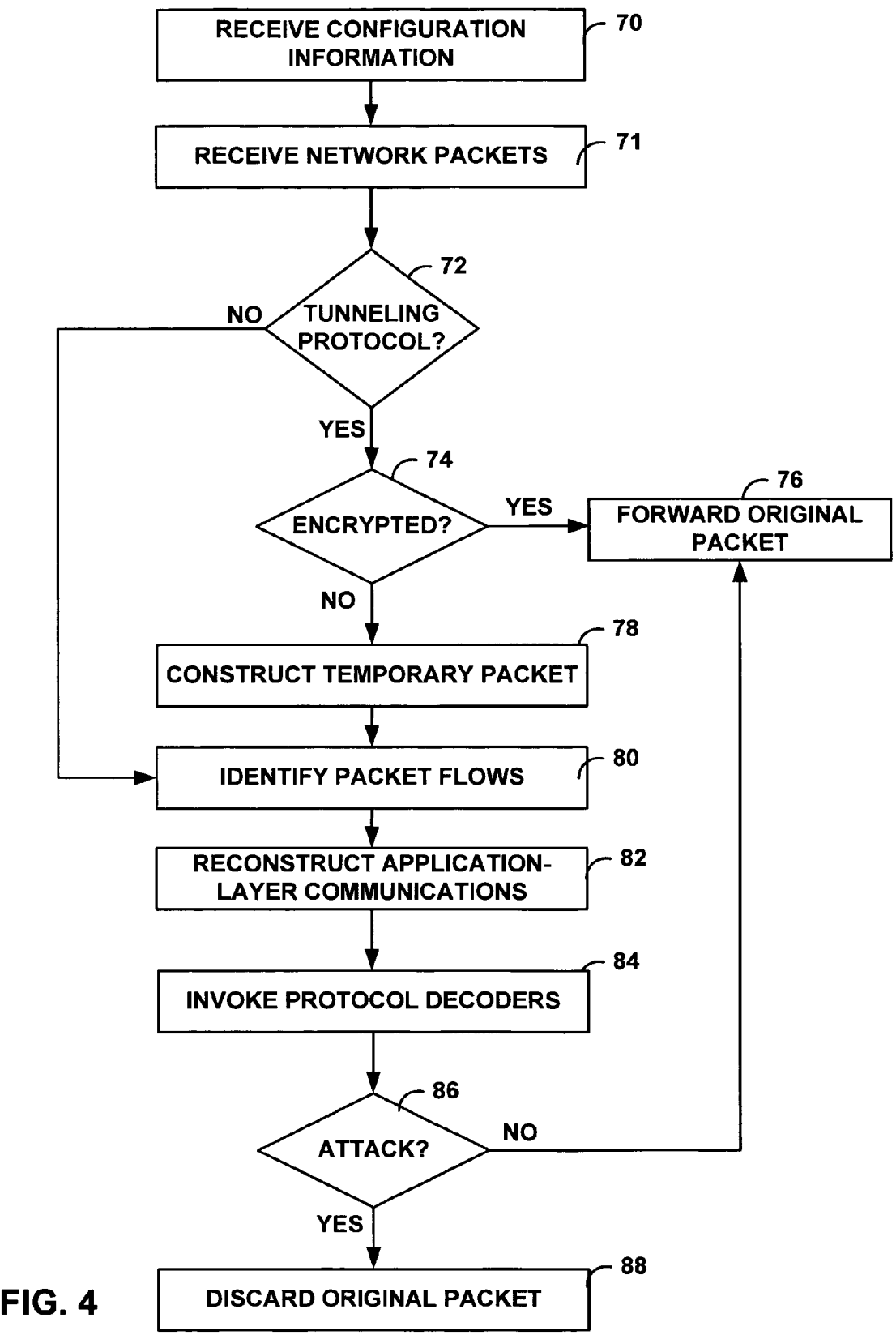
FIG. 4 is a flowchart illustrating exemplary operation of an IDP device in accordance with the principles of this invention.

FIG. 4 is a flowchart illustrating the operation of an IDP device according to the principles of this invention. For exemplary purposes, the flowchart references example IDP device 20 in FIG. 2.

Initially, configuration manager 62 receives configuration information from administrator 60 and, in response, configures IDP device 20 to monitor subnets of interest (70). Once configured, IDP device 20 monitors inbound network traffic 24 and, in particular, receives network packets (71).

For each network packet, filter module 28 first determines whether the incoming network packet is associated with a tunneling protocol and, therefore, includes a payload that encapsulates a data unit, e.g., packets, frames, cells or other forms of data units (72). If the network packet is not associated with a tunneling protocol, filter module 28 forwards the packet to flow analysis module 32 via packet stream 30 for analysis and attack detection. In other words, when the network packet is not associated with a tunneling protocol, the network packet does not include a payload that encapsulates another data unit. As a result, filter module 28 may forward the network packet directly to flow analysis module 32 and attack detection engine 40 for analysis.

If, however, the packet is associated with a network tunnel, filter module 28 further analyzes the packet to determine whether the data unit encapsulated within the payload is encrypted (74). As further described below, filter module 28 may apply protocol-specific techniques to heuristically determine whether the encapsulated data unit is encrypted. If the data unit is encrypted, filter module 28 bypasses flow analysis module 32 and sends the original packet to forwarding component 44 via packet stream 34 without further analysis (76).

If the encapsulated data unit is not encrypted, filter module 28 constructs a temporary packet from the encapsulated data unit to mimic a non-tunneled packet capable of being processed by flow analysis module 32 and attack detection engine 40 (78). For example, filter module 28 may extract portions of the encapsulated data unit and construct a TCP or UDP packet that may be analyzed by flow analysis module 32 and attack detection engine 40. Once filter module 28 has constructed the temporary packet, the filter module forwards the temporary packet to flow analysis module 32 via packet stream 30 for further analysis.

At this point, the temporary packets generated by filter module 28 essentially rejoin the stream of unencapsulated packets that flows through flow analysis module 32 and attack detection engine 40 for attack detection and prevention. In particular, flow analysis module 32 analyzes the network traffic to identify packet flows and updates flow table 36 to describe each active flow present within the network traffic (80). Next, attack detection engine 40 buffers and reassembles the packets to form application-layer communications 46 (82), and invokes the appropriate protocol decoders 48 to analyze the application-layer communications (84). Protocol decoders 48 analyze reassembled application-layer communications 46 and communicate transaction data 51, application-layer elements 53 and protocol anomaly data 55 to profiler 52 for recording within correlation database 56.

In the event an attack is not detected based on analysis of the temporary packets (86), forwarding component 41 forwards the original tunneled packets (76). However, in the event an attack is detected, attack detection engine 40 may output instructions directing forwarding component 44 to drop the original tunneled packets from which the temporary packets were generated (88).

Figure 5:
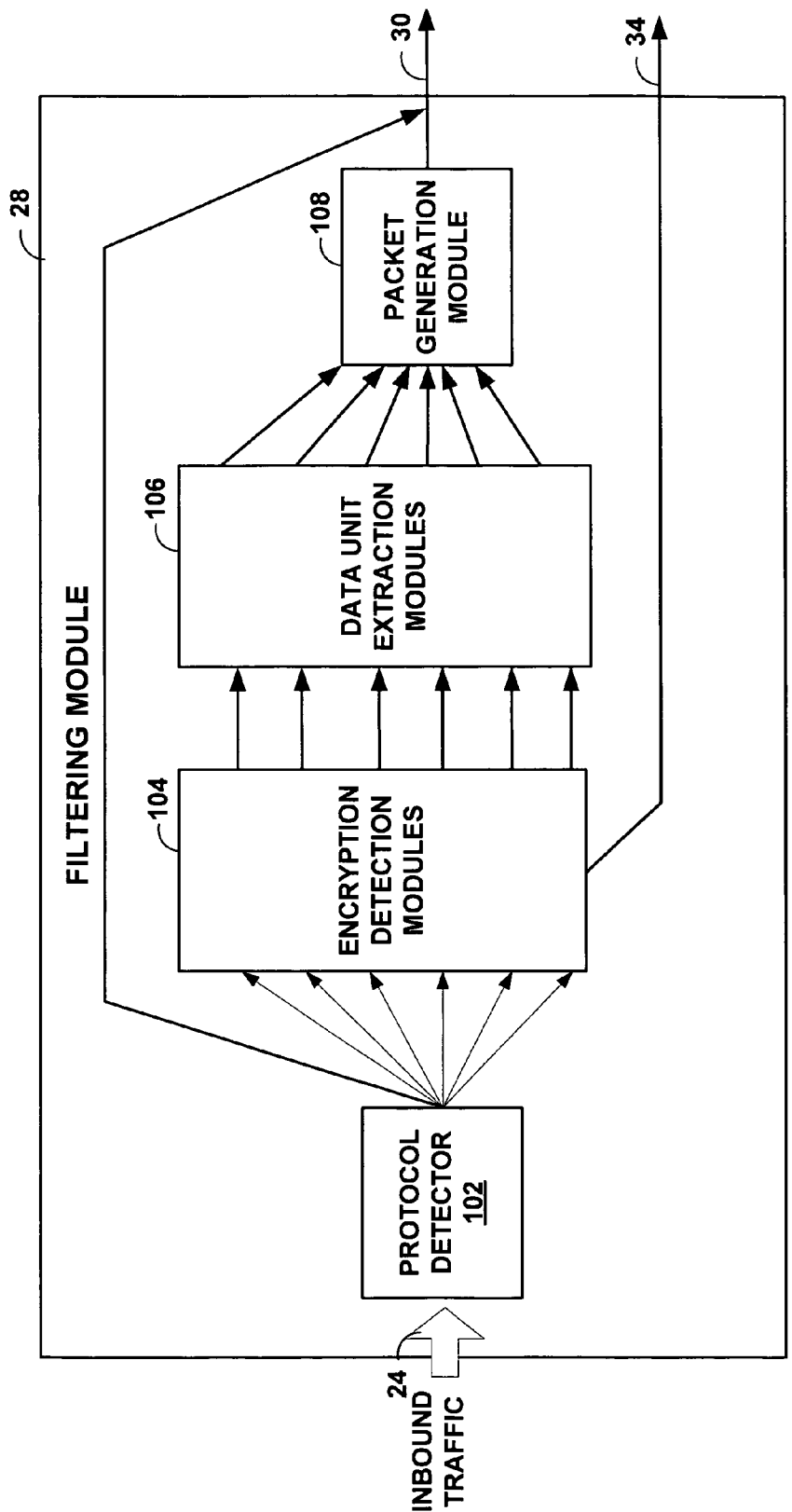
FIG. 5 is a block diagram illustrating an exemplary embodiment of a filter module.

FIG. 5 is a block diagram that illustrates one example embodiment of filter module 28. In the illustrated embodiment, filter module 28 contains a protocol detector 102, a plurality of protocol-specific encryption detection modules 104, a plurality of protocol-specific data unit extraction modules 106, and a packet generation module 108.

Protocol detector 102 receives inbound traffic 24 and scans protocol fields of the incoming packets to determine whether the incoming packets are associated with a tunneling protocol. Protocol detector 102 passes the non-tunneled packets directly to flow analysis module 32 via packet stream 30. On the other hand, if incoming packet 24 is associated with a tunneling protocol, protocol detector 102 further analyzes the packets to determine the type of protocol associated with the data units that are encapsulated within the packets.

Based on the protocol, protocol detector 102 passes the packets to one of protocol-specific encryption detection modules 104 to determine whether the data units encapsulated within the packets are encrypted. As described herein, each of encryption detection modules 104 may apply a set of protocol-specific heuristics to determine whether the encapsulated data units are encrypted. If the data units are encrypted, encryption detection modules 104 bypass flow analysis module 32 and send the original packets to forwarding component 44 via packet stream 34 without further analysis.

If the encapsulated data units are not encrypted, encryption detection modules 104 forward the original packets to appropriate protocol-specific data unit extraction modules 106. In general, data unit extraction modules 106 apply protocol-specific algorithms to extract the encapsulated data units, which may by encapsulated packets, frames, cells or other types of data units.

Packet generation module 108 constructs temporary packets from the encapsulated data units. More specifically, packet generation module 108 generates temporary packets for internal use within IDP device 20 and in accordance with a protocol supported by flow analysis module 32 and attack detection engine 40. In this manner, the temporary packets mimic non-tunneled packets capable of being processed by flow analysis module 32 and attack detection engine 40. In one embodiment, each temporary packet includes a tunnel field that is used to identify the corresponding original packet. Based on the analysis of the temporary packets by flow analysis module 32 and attack detection engine 40, forwarding component 44 (FIG. 2) either forwards or discards the original packets referenced by the temporary packets.

Figure 6A:
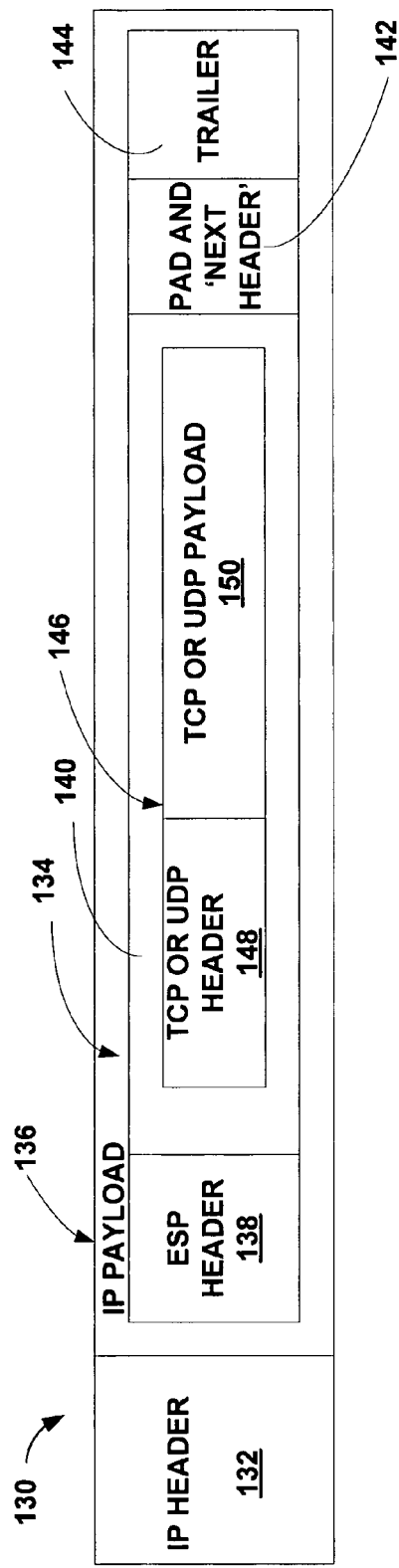
FIGS. 6A and 6B are block diagrams illustrating Internet Protocol (IP) packets encapsulating Encapsulated Security Payload (ESP) packets for Internet Protocol Security (IPsec) tunneling.
Figure 6B:
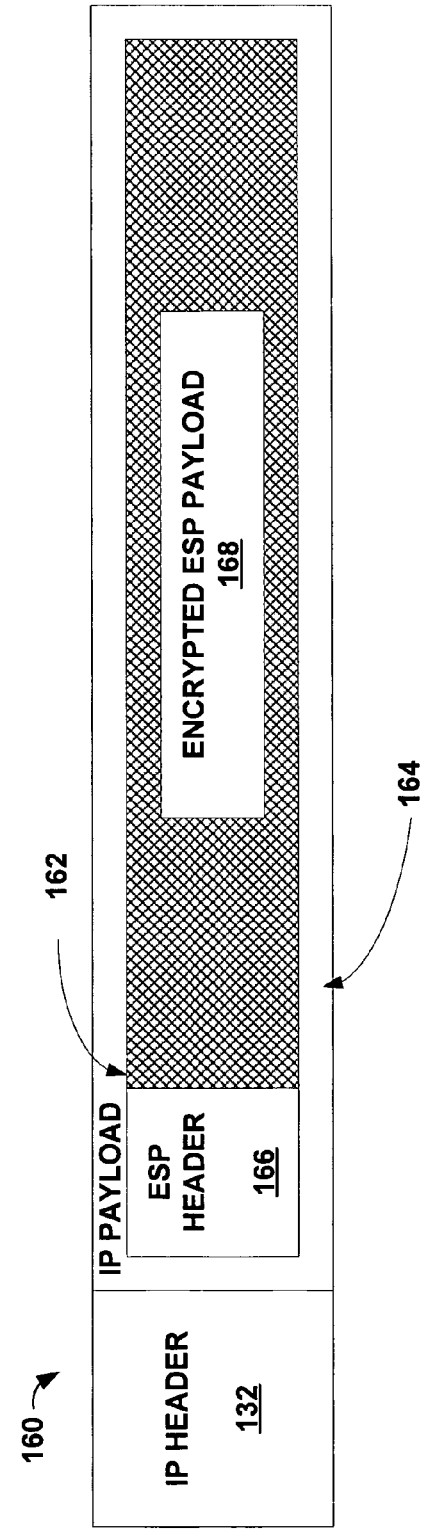

FIGS. 6A and 6B are block diagrams illustrating two exemplary IP packets for Internet Protocol Security (IPsec) tunneling. In particular, FIG. 6A illustrates an exemplary IPsec packet 130 having a non-encrypted payload. In contrast, FIG. 6B illustrates an exemplary IPsec packet 160 having an encrypted payload.

In general, IPsec allows encapsulation of packets encoded according to one of several different security protocols, such as the Encapsulated Security Payload (ESP). A protocol field of the IP header 132 specifies the particular protocol used to encapsulate the payload. For example, ESP uses IP protocol number 50 and Authentication Header (AH) uses 51. Only some of the IPsec security protocols call for data encryption. Alternatively, if the IP packet 130 conforms to IP version 6 (IPv6), a "next header" field identifies the protocol type.

In the example of FIG. 6A, IP packet 130 encapsulates an unencrypted ESP packet 134 within its payload 136. ESP packet 134 retains all the normal parts of an ESP packet. As illustrated, ESP packet 134 has its own header 138, payload 140, pad and "next header" block 142 and a trailer 144. In the context of tunneling, the "next header" block 142 identifies the protocol associated with the encapsulated data within payload 136. In this example, ESP packet 134 encapsulates a TCP or UDP packet 146 that, in turn, has its own distinct header 148 and payload 150. As described, IDP device 20 (FIG. 2) constructs a temporary packet from the encapsulated packet 146 that is capable of being seamlessly analyzed with other network traffic. IDP device 20 may, for example, construct a complete packet that may be processed internally within the IDP device.

In contrast, FIG. 6B shows another IP packet 160 encapsulating an ESP packet 162 in its payload 164. The difference, however, is that the ESP payload 168 of ESP packet 162 is encrypted. As FIG. 6B shows, the "next header" block 142 of FIG. 6A and other data fields within the encrypted portion are inaccessible. In this case, IDP device 20 does not generate a temporary packet and forwards IP packet 160 without further processing.

Figure 7:
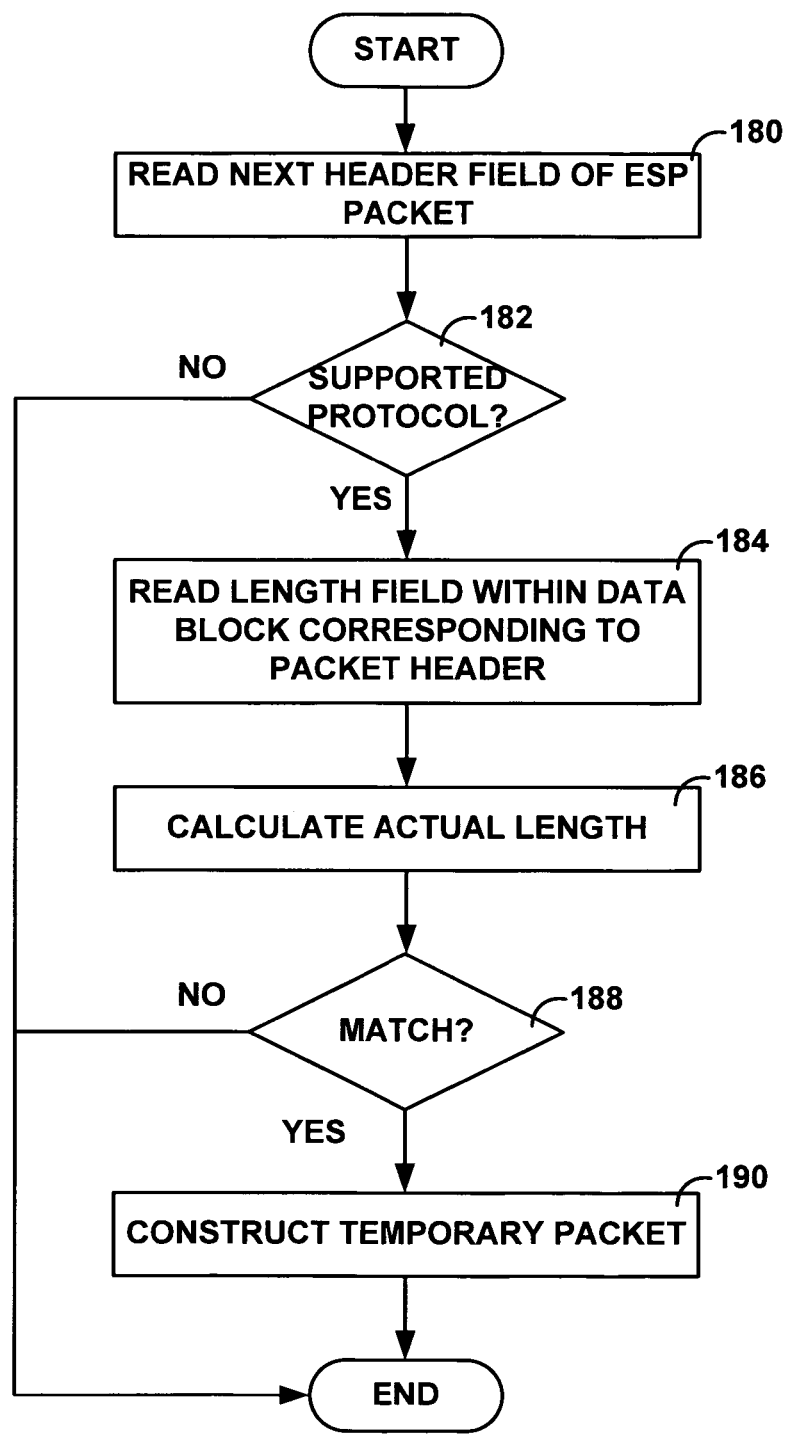
FIG. 7 is a flowchart showing an exemplary operation of the IDP device when determining whether an IPsec/ESP packet is encrypted.

FIG. 7 is a flowchart illustrating exemplary operation of filter module 28 (FIG. 2) when processing IPSec packets, such as IPSec packets 130, 160 shown in FIGS. 6A and 6B. Upon receiving a packet associated with the IPSec tunneling protocol, filter module 28 heuristically determines whether the contained payload is unencrypted (as shown in FIG. 6A) or encrypted (as shown in FIG. 6B). In particular, filter module 28 attempts to read the "next header" field of the packet encapsulated within ESP payload (180) and determines whether the field identifies a supported protocol in association with encapsulated packet (182). For example, a value of 6 or 17 within the "next header" field indicates that ESP payload may be an encapsulated TCP or a UDP packet, respectively.

If the value is some other number (NO of 182), then encryption detection module 104 determines that either the payload of the ESP packet is encrypted or that the encapsulated packet does not conform to a supported protocol, e.g., TCP or UDP. In either case, filter module 28 ceases processing the IPsec packet, and forwards the IPsec packet in unmodified form to forwarding component 44.

However, if the next header field indicates a supported protocol (YES of 182), filter module 28 performs another test to confirm that the payload is indeed unencrypted and that the values within the next header field were not random values that happened to match proper protocol identifiers. More specifically, filter module 28 further examines the ESP payload as if it were a non-encrypted packet conforming to the protocol specified within the next header field. In particular, filter module 28 attempts to access a field within the header that indicates a length for the packet (184). For example, if the protocol identifiers within the next header field indicate the ESP payload is an encapsulated TCP packet, filter module 28 examines the first two bits of the eighth byte of the ESP payload in an attempt to read a TCP header. For UDP, filter module 28 attempts to read the seventh and eighth bytes of the ESP payload.

After filter module 28 has determined the length of encapsulated packet 146 according to the encapsulated header, filter module 28 calculates the actual length of the encapsulated packet (186). Filter module 28 compares the indicated length to the actual length (188). If the length determined from the TCP or UDP header 148 matches the actual length of the data in the ESP payload, then filter module 28 determines that the ESP payload is likely an unencrypted TCP or UDP packet (YES of 188). For example, encapsulated packet 146 may be associated with a non-secure (i.e., unencrypted) network tunnel. As another example, encapsulated packet 146 may form part of an authentication process for a secure network tunnel and, as such, is not encrypted. In any case, filter module 28 extracts encapsulated packet 146 and modifies the packet to form a complete, temporary packet that may be forwarded and processed within IDP device 20 (190).

If the lengths do not match (NO of 188), filter module 28 determines that either the payload is encrypted or the encapsulated packet does not conform to a supported protocol, e.g., TCP or UDP. In either case, filter module 28 ceases processing the tunneled packet, and filter module 28 forwards the unmodified (original) packet to forwarding component 44. In this manner, filter module 28 applies protocol-specific, heuristic techniques to determine whether the payload within a tunneled packet is encrypted.

Figure 8:
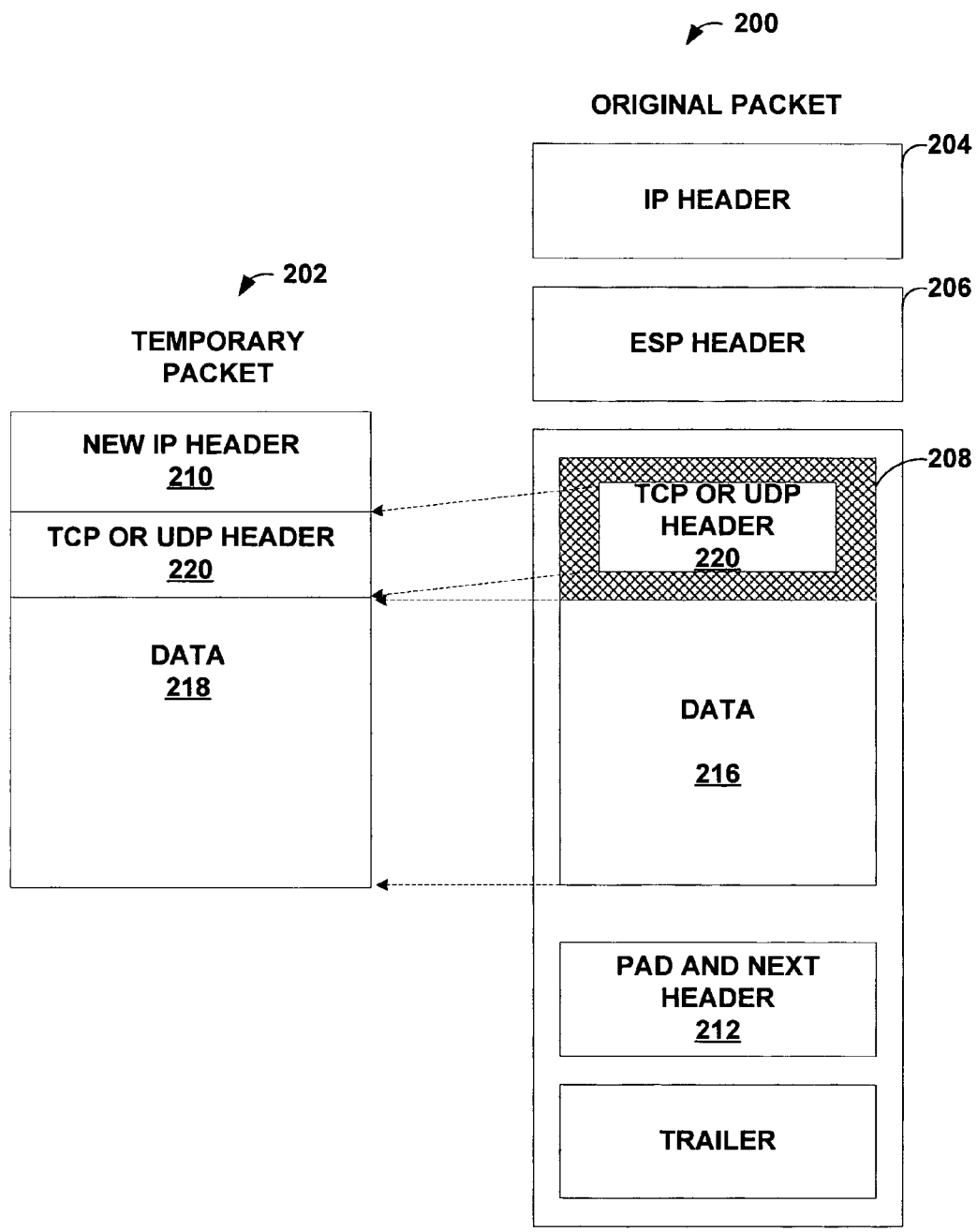
FIG. 8 is a block diagram illustrating creation of a temporary packet from an IP packet encapsulating an ESP packet.

FIG. 8 is a block diagram showing an exemplary temporary packet 202 constructed from an original IPsec packet 200 associated with a network tunnel. As illustrated, packet 200 represents an IP packet in which the ESP protocol is used to encapsulate a TCP or UDP packet.

When constructing temporary packet 202, filter module 28 copies certain fields from original IP header 204 into a new IP header 210. Filter module 28 then updates fields within new IP header 210, including completing a protocol field with the protocol identifier read from the "next header" field 212 of the ESP packet.

Next, filter module 28 extracts TCP or UDP header 220 and payload 216 from payload 208 of the ESP packet, and copies the extracted portions into temporary packet 202.

Finally, filter module 28 sets a tunnel pointer in new IP header 210 to point to original packet 200, thereby allowing forwarding component 44 to identify the original packet when making forwarding decisions based on the analysis of temporary packet 200.

Figure 9A:
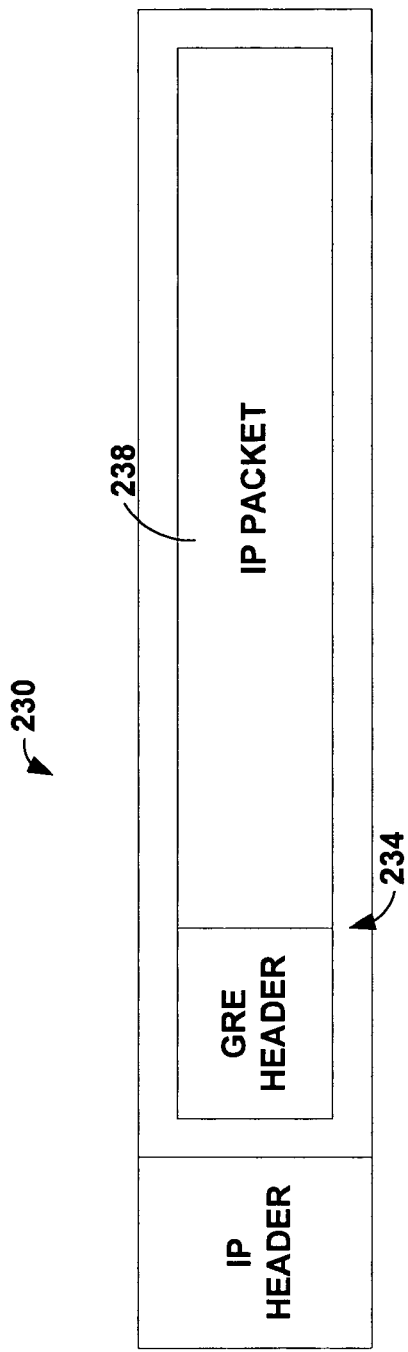
FIGS. 9A and 9B are block diagrams illustrating exemplary IP packets encapsulating two different types of Generic Routing Encapsulation (GRE) packets.
Figure 9B:
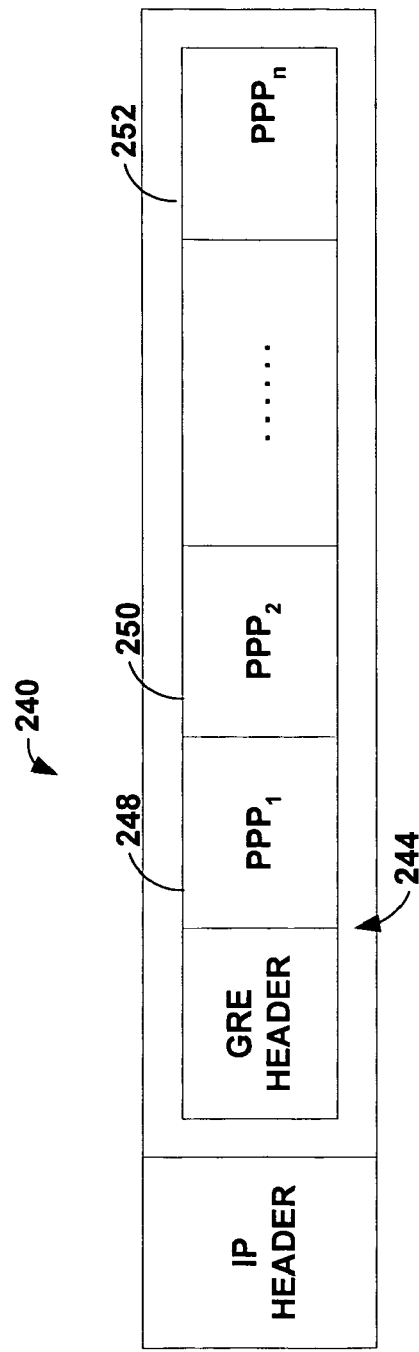

FIGS. 9A and 9B are block diagrams illustrating two examples of packets that conform to the GRE tunneling protocol that may be processed by filter module 28. In particular, FIG. 9A shows an exemplary IP packet 230 encapsulating a GRE packet 234. GRE packet 234, in turn, encapsulates another IP packet 238. FIG. 9B shows an IP packet 240 encapsulating a GRE packet 244. In this example, GRE packet 244 encapsulates a series of Point-to-Point (PPP) protocol frames 248-252, which may be complete or partial frames. In other words, portions of the frames may be in previous or subsequent GRE packets. Although not illustrated, each of these PPP frames 248-252 has its own frame header and data.

FIGS. 9A and 9B are shown for exemplary purposes only. The GRE protocol may be used to encapsulate a large number of other protocols. In certain applications, the GRE tunneling protocol may be used to encapsulate communications from a wireless communication network, such as code division multiple access (CDMA) or Global System for Mobile Communication (GSM).

Figure 10:
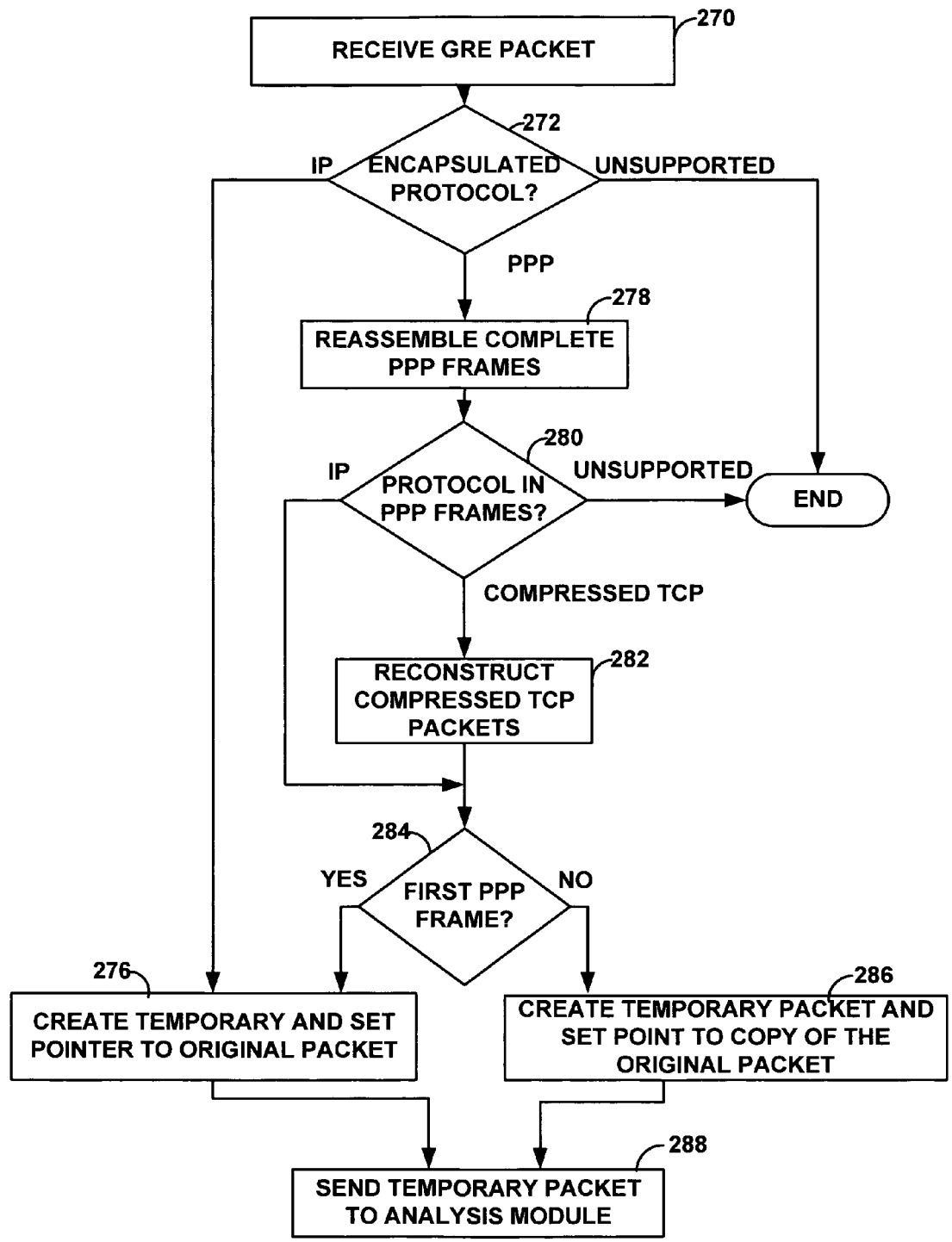
FIG. 10 is a flowchart showing an example procedure for extraction of packet information from an IP packet carrying a Point-to-Point Protocol (PPP) payload.

FIG. 10 is a flowchart illustrating exemplary operation of filter module 28 (FIG. 2) when processing GRE packets, such as GRE packets 230, 240 shown in FIGS. 8A and 8B.

Upon receiving a packet associated with the GRE tunneling protocol (270), filter module 28 accesses the GRE header to determine the protocol associated with the encapsulated data unit or data units (272). If the GRE protocol field does not specify a supported protocol, filter module 28 ceases processing the GRE packet and forwards the GRE packet in unmodified form to forwarding component 44.

In this example, filter module 28 supports encapsulated GRE packets that encapsulate IP packets and PPP frames. For example, a value of 0x0080 in the protocol field of the GRE header indicates the GRE packet encapsulates an IP packet. In this case, filter module 28 discards the outer IP header and the GRE header and generates a temporary packet from the remaining unencapsulated IP packet (276). Filter module 28 sets a tunnel field of this temporary packet to a location of original incoming packet.

As another example, a value of 0x8881 in the protocol field of the GRE header indicates the GRE packet encapsulates one or more complete or incomplete PPP frames. In this case, filter module 28 first buffers and reassembles the encapsulated data to form complete PPP frames so that it can deal with each frame separately (278). Next, filter module 28 determines the protocol for the data units carried within the PPP frames (280). For example, each PPP frame typically contains a four or eight byte header indicating the protocol of the packet contained in that frame. If the PPP frame does not contain a supported protocol, filtering module 28 ceases processing the GRE packet and forwards the GRE packet in unmodified form to forwarding component 44.

In this example, filter device 28 supports PPP frames that carry IP packets or compressed TCP packets. If the PPP header indicates an IP packet unencapsulation module 106 discards the GRE and PPP frame headers to get the IP packet.

For compressed TCP packets within the PPP frames, filter module 28 reconstructs the compressed TCP packets based on PPP protocol type, PPP frame information and stored stateful information (282). For example, Van Jacobson TCP compression is often used in compressing IP and TCP headers for packets transmitted over PPP links. The first packet of the TCP session is transmitted in its original form. Subsequent packets in the session only include a session identifier in the header and the differences between the current packet and the previous packet headers. Filter module 28 removes this compression to create temporary packets for processing by flow analysis module 32 and attack detection engine 40.

If the PPP frame header contains 0x002f in the protocol field, then the PPP frame represents the first packet of a Van Jacobson TCP session. When filter module 28 sees a frame header with this code, the filter module stores the full TCP and IP headers in a table. In this table, filter module 28 indexes packet headers by session identifier. The table entry exists until the communicating network devices send the signals to terminate the TCP session.

Subsequent PPP frames of the session having headers with protocol code 0x002d contain Van Jacobson compressed headers. When filter module 28 sees this code, the filter module checks the Van Jacobson compression header for the session identifier. Filter module 28 uses the session identifier to look up the packet header in the Van Jacobson table. Once filter module 28 retrieves this information, the filter module reconstructs the uncompressed IP and TCP headers. After retrieving the header information, filter module 28 updates the table to reflect changes caused by the new header. In this manner, filter module 28 reconstructs the compressed TCP packets carried by the PPP frames that were encapsulated using the GRE protocol.

When generating temporary packets, filter module 28 determines whether the PPP frame is the first PPP frame in the GRE packet (284). If so, filter module 28 creates a temporary packet and sets the temporary packet's tunnel pointer to identify the original packet (276). If the current frame was not the first frame in the GRE packet, filter module 28 creates a temporary packet and sets the temporary packet's frame pointer to identify a copy of the original packet (286).

After processing all complete frames in a GRE packet, filter module 28 updates the buffer to store any remaining incomplete frame and sends the temporary packets to flow analysis module 32 (288).

Various embodiments of the invention have been described. Although the embodiments have been described in terms of packet-based systems and specific networking protocols, the techniques may be applied to any network tunneling protocol without departing from the principles of the invention. These and other embodiments are within the scope of the following claims.

The invention claimed is:

1. A method comprising:
 receiving, with an intermediate device, packets;
 determining, with the intermediate device, whether one or more of the received packets are associated with a network tunnel that extends from an ingress device to an egress device by detecting the protocol to which the packet adheres, wherein those of the received packets determined to be associated with the network tunnel encapsulate data units for transmission along the network tunnel, wherein the intermediate device is positioned between the ingress device and the egress device along the network tunnel, and wherein the intermediate device is separate from both the ingress device and the egress device;
 applying a set of heuristics to the data units to determine whether the data units are encrypted;

when the data units are determined not to be encrypted, extracting, with the intermediate device, the encapsulated data units from the one or more received packets determined to be associated with the network tunnel;

when the data units are determined not the be encrypted, generating, with the intermediate device, temporary packets from the data units, wherein the temporary packets are different from the originally received packets;

analyzing, with the intermediate device, the temporary packets to detect a network attack, wherein analyzing the temporary packet to detect a network attack comprises processing the data units within the temporary packets with the intermediate network device to identify network elements associated with the data units, forming application-layer communications from the data units within the temporary packets, processing the application-layer communications with protocol-specific decoders to identify application-layer elements, and applying an attack definition to the network elements and the application-layer elements to detect the network attack;

selectively transmitting, with the intermediate device, the originally received packets to the egress device based on the analysis of the temporary packets such that the originally received packets that share the same data units as the temporary packets from which the network attack is detected are not transmitted and the originally received packets that share the same data units as the temporary packets from which the network attack is not detected are transmitted;

analyzing, with the intermediate device, those of the received packets determined not to be associated with the network tunnel to detect a network attack without generating the temporary packets from the received packets; and selectively transmitting, with the intermediate device, those of the received packets determined not to be associated with the network tunnel based on the analysis of these packets.

2. The method of claim 1, wherein the data units comprise packets or frames.

3. The method of claim 1, wherein the data units conform to a protocol associated with a wireless communication network.

4. The method of claim 1, wherein generating temporary packets comprises pre-pending headers to the data units to form the temporary packets in accordance with a protocol supported by the intermediate device.

5. The method of claim 1, wherein generating temporary packets comprises:
buffering a plurality of the data units to form communication frames; and
pre-pending headers to the communication frames to form the temporary packets.

6. The method of claim 1, wherein generating temporary packets comprises:
determining a protocol for the data units; and
applying a protocol-specific algorithm to generate the temporary packets from the data units.

7. The method of claim 6, wherein the protocol comprises one of the Transmission Control Protocol (TCP), User Datagram Protocol (UDP), Point-to-Point Protocol (PPP), or Internet Protocol (IP).

8. The method of claim 1, wherein selectively extracting and analyzing comprises:
extracting the data units, generating the temporary packets from the data units and analyzing the data units of the temporary packets to detect the network attack when the data units are unencrypted; and
forwarding the originally received packets without otherwise extracting the data units, generating the temporary packets from the data units and analyzing the data units of the temporary packets when the data units are encrypted.

9. The method of claim 1, wherein the network elements include low-level network information including at least one of a network host, network peers or a network port associated with the network traffic.

10. The method of claim 1, wherein the application-layer elements comprise named elements that uniquely identify types of the application-layer elements and values for the named elements.

11. The method of claim 10, wherein the named elements for the application-layer communications include at least one of a file name, a user name, a software application name or a name of an attached document.

12. The method of claim 1, wherein selectively transmitting the original packets comprises:
discarding the originally received packets upon detecting the network attack within the temporary packets, and
forwarding the originally received packets when the network attack is not detected within the temporary packets.

13. The method of claim 1,
wherein the packets associated with the network tunnel conform to a tunneling protocol and include headers that identify the tunnel, and
wherein the encapsulated data units within the packet conform to a protocol different from the tunneling protocol and have at least one header.

14. The method of claim 13,
wherein generating the temporary packets comprises:
removing the header from the tunneled packet with the intermediate device;
pre-pending a new header to form a non-tunneled temporary packet with the intermediate device, wherein the new header is associated with a protocol other than the tunneling protocol, and
wherein analyzing the data units comprises analyzing the non-tunneled temporary packet with the intermediate device to detect the network attack.

15. A method comprising:
receiving, with an intermediate device, packets;
determining, with the intermediate device, whether one or more of the received packets are associated with a network tunnel that extends from an ingress device to an egress device by detecting the protocol to which the packet adheres, wherein those of the received packets determined to be associated with the network tunnel encapsulate data units for transmission along the network tunnel, wherein the intermediate device is positioned between the ingress device and the egress device along the network tunnel, and wherein the intermediate device is separate from both the ingress device and the egress device;
applying a set of heuristics to the data units to determine whether the data units are encrypted;
when the data units are determined not to be encrypted, extracting, with the intermediate device, the encapsulated data units from the one or more received packets determined to be associated with the network tunnel;
when the data units are determined not the be encrypted, generating, with the intermediate device, temporary packets from the data units, wherein the temporary packets are different from the originally received packets;

analyzing, with the intermediate device, the temporary packets to detect a network attack based upon application of an attack definition;

selectively transmitting, with the intermediate device, the originally received packets to the egress device based on the analysis of the temporary packets such that the originally received packets that share the same data units as the temporary packets from which the network attack is detected are not transmitted and the originally received packets that share the same data units as the temporary packets from which the network attack is not detected are transmitted;

analyzing, with the intermediate device, those of the received packets determined not to be associated with the network tunnel to detect a network attack without generating the temporary packets from the received packets; and selectively transmitting, with the intermediate device, those of the received packets determined not to be associated with the network tunnel based on the analysis of these packets;

wherein applying a set of heuristics comprises:

examining the data units for indicators of a size of payloads within the data units;

determining an actual size for each of the payloads;

comparing the indicators with the actual size of each of the payloads; and determining whether the data units are encrypted based on a result of the comparison.

16. The method of claim 15, wherein examining the data units comprises:

determining a protocol associated with the data units; and selecting the indicators from the data units based on the protocol.

17. A network device comprising:

a filter module to receive packets, determine whether one or more of the received packets are associated with a network tunnel that extends from an ingress device to an egress device by detecting the protocol to which the packet adheres, wherein those of the received packets determined to be associated with the network tunnel encapsulate data units for transmission along the network tunnel, apply a set of heuristics to the data units to determine whether the data units are encrypted and, when the data units are determined not to be encrypted, extract data units encapsulated within those of the packets determined to be associated with the network tunnel, wherein the network device is positioned between the ingress device and the egress device along the network tunnel, and wherein the intermediate device is separate from both the ingress device and the egress device, wherein the filter module includes a packet generation module to generate, when the data units are determined not to be encrypted, temporary packets from the extracted data units, wherein the temporary packets are different from the originally received packets;

an attack detection engine to process the data units within the temporary packets to identify network elements associated with the data units, form application-layer communications from the data units within the temporary packets, process the application-layer communications with protocol-specific decoders to identify application-layer elements to detect a network attack; and a forwarding component to selectively forward the originally received packets to the egress device based on the analysis of the temporary packets such that the originally received packets that share the same data units as the temporary packets from which the network attack is detected are not transmitted and the originally received packets that share the same data units as the temporary packets from which the network attack is not detected are transmitted, wherein the forwarding component further analyzes those of the received packets determined not to be associated with the network tunnel to detect a network to detect a network attack without generating the temporary packets from the received packets, and selectively transmitting those of the received packets determined not to be associated with the network tunnel based on the analysis of these packets.

18. The network device of claim 17, wherein the data units comprise packets, frames or cells.

19. The network device of claim 17, wherein the data units conform to a protocol associated with a wireless communication network.

20. The network device of claim 17, wherein the packet generation module pre-pends headers to the data units to form the temporary packets in accordance with a protocol supported by the attack detection engine.

21. The network device of claim 17, wherein the packet generation module buffers the data units to form communication frames that span one or more of the packets, and wherein the packet generation module pre-pends headers to the communication frames to form the temporary packets.

22. The network device of claim 17, wherein the packet generation module determines a protocol for the data units, and applies a protocol-specific algorithm to extract the data units and generate the temporary packets from the data units based on the determined protocol.

23. The network device of claim 22, wherein the protocol comprises one of Transmission Control Protocol (TCP), User Datagram Protocol (UDP), Point-to-Point Protocol (PPP), or Internet Protocol (IP).

24. The network device of claim 17, wherein the forwarding component includes a routing table storing routes for a network.

25. The network device of claim 17, wherein the network device comprises a router or a firewall.

26. The network device of claim 17, wherein the attack detection module analyzes those of the received packets determined not to be associated with the network tunnel to detect a network attack without generating temporary packets, and wherein the forwarding component selectively forwards those of the received packets determined not to be associated with the network tunnel based on the analysis of these packets.

27. A network device comprising:

a filter module to receive packets, determine whether one or more of the received packets are associated with a network tunnel that extends from an ingress device to an egress device by detecting the protocol to which the packet adheres, wherein those of the received packets determined to be associated with the network tunnel encapsulate data units for transmission along the network tunnel, apply a set of heuristics to the data units to determine whether the data units are encrypted and, when the data units are determined not to be encrypted, extract data units encapsulated within those of the packets determined to be associated with the network tunnel, wherein the network device is positioned between the ingress device and the egress device along the network tunnel, and wherein the intermediate device is separate from both the ingress device and the egress device, wherein the filter module includes a packet generation module to generate, when the data units are determined not to be encrypted, temporary packets from the extracted data units, wherein the temporary packets are different from the originally received packets;

an attack detection engine to analyze packets to detect a network attack based on application of an attack definition; and a forwarding component to selectively forward the originally received packets to the egress device based on the analysis of the temporary packets such that the originally received packets that share the same data units as the temporary packets from which the network attack is detected are not transmitted and the originally received packets that share the same data units as the temporary packets from which the network attack is not detected are transmitted, wherein the forwarding component further analyzes those of the received packets determined not to be associated with the network tunnel to detect a network attack without generating the temporary packets from the received packets, and selectively transmitting those of the received packets determined not to be associated with the network tunnel based on the analysis of these packets, wherein the filter module examines the data units to determine indicators of a size of payloads within the data units and compares the indicators with an actual size for each of the payloads, and extracts the data units based on the result of the comparison.

28. A computer-readable medium comprising instructions that cause a programmable processor within a network device to:

present a user interface that receives input specifying an attack definition; and configure a forwarding plane of the network device to receive packets;

determine whether one or more of the received packets are associated with a network tunnel that extends from an ingress device to an egress device by detecting the protocol to which the packet adheres, wherein those of the received packets determined to be associated with the network tunnel encapsulate data units for transmission along the network tunnel;

apply a set of heuristics to the data units to determine whether the data units are encrypted;

when the data units are determined not to be encrypted, extracting the encapsulated data units from the one or more received packets determined to be associated with the network tunnel;

when the data units are determined not to be encrypted, generate temporary packets from data units encapsulated within those of the originally received packets determined to be associated with the network tunnel;

apply the attack definition to the temporary packets to detect a network attack by processing the data units within the temporary packets with the network device to identify network elements associated with the data units, forming application-layer communications with protocol-specific decoders to identify application-layer elements, and applying the attack definition to the network elements and the application-layer elements to detect the network attack; and forward the originally received packets to an egress device of the tunnel based on the application of the attack definition to the temporary packets such that those of the originally received packets sharing the same data units as those of the temporary packets from which the network attack is detected are not transmitted and those of the originally received packets sharing the same data units as those of the temporary packets from which the network attack is not detected are transmitted, wherein the forwarding component further analyzes those of the received packets determined not to be associated with the network tunnel to detect a network to detect a network attack without generating the temporary packets from the received packets, and selectively transmitting those of the received packets determined not to be associated with the network tunnel based on the analysis of these packets, wherein the network device is positioned between the ingress device and the egress device, and wherein the network device is separate from both the ingress device and the egress device.

* * * * *